United States Patent
Zhou et al.

(10) Patent No.: US 11,678,064 B2
(45) Date of Patent: Jun. 13, 2023

(54) METHOD FOR DETECTING AND REDUCING VIDEO FLICKER AND IMAGE PROCESSING DEVICE

(71) Applicant: ARKMICRO TECHNOLOGIES (SHENZHEN) CO., LTD., Shenzhen (CN)

(72) Inventors: Mi Zhou, Shenzhen (CN); Weijian Yan, Shenzhen (CN); Junxiu Liu, Shenzhen (CN); Ling Shi, Shenzhen (CN)

(73) Assignee: ARKMICRO TECHNOLOGIES (SHENZHEN) CO., LTD., Shenzhen (CN)

(*) Notice: Subject to any disclaimer, the term of this patent is extended or adjusted under 35 U.S.C. 154(b) by 245 days.

(21) Appl. No.: 17/105,608

(22) Filed: Nov. 26, 2020

(65) Prior Publication Data
US 2022/0116530 A1    Apr. 14, 2022

(30) Foreign Application Priority Data
Oct. 10, 2020    (CN) .......................... 202011079591.8

(51) Int. Cl.
| | | |
|---|---|---|
| H04N 23/745 | (2023.01) | |
| G06T 7/12 | (2017.01) | |
| G06T 5/40 | (2006.01) | |
| H04N 7/01 | (2006.01) | |

(52) U.S. Cl.
CPC ............ *H04N 23/745* (2023.01); *G06T 5/40* (2013.01); *G06T 7/12* (2017.01); *H04N 7/0132* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 2007/0153094 A1* | 7/2007 | Noyes ................... | H04N 5/2357 348/E5.041 |
| 2011/0157416 A1* | 6/2011 | Chen ..................... | H04N 5/2357 348/E9.051 |
| 2012/0081569 A1* | 4/2012 | Yost ...................... | H04N 5/2353 348/226.1 |
| 2019/0289191 A1* | 9/2019 | Noda .................... | H04N 23/635 |

* cited by examiner

*Primary Examiner* — Quan Pham
(74) *Attorney, Agent, or Firm* — Cheng-Ju Chiang

(57) ABSTRACT

The present invention relates to video processing, and provides a method for detecting and reducing video flicker. The method for detecting video flicker includes steps of: calculating the line sums of the luminance components of two adjacent frames in a video frame sequence; comparing the line sums of the luminance components of the two adjacent frames, and calculating a flicker component; obtaining the light source flicker frequency according to an assumed k value; determining two different local intervals by the coordinates of a current point of the flicker component according to the light source flicker frequency; and respectively calculating a peak function and a valley function of the flicker component in the two different local intervals; and determining whether there is video flicker caused by the light source in the current frame according to the peak function and the valley function of the flicker component.

17 Claims, 2 Drawing Sheets

METHOD FOR DETECTING AND REDUCING VIDEO FLICKER AND IMAGE PROCESSING DEVICE

CROSS REFERENCE TO RELATED APPLICATIONS

The present application claims priority of Chinese Patent Application No. 202011079591.8, filed on Oct. 10, 2020, the disclosure of which is incorporated by reference herein.

FIELD OF THE INVENTION

The present invention relates generally to the field of video processing, and particularly relates to a method for detecting and reducing video flicker, a computer-readable storage medium and an image processing device.

BACKGROUND OF THE INVENTION

As the application of camera devices in real-time monitoring becomes more and more common, the performance requirements for camera devices are also increasing. At present, most CMOS sensors of camera devices use roller shutters. For any pixel, zeroing at the beginning of exposure and then reading out the signal value after the exposure time passed. Because the data readout is serial, so the zeroing, exposure, and readout can only be performed line by line, that is, different lines of the image are collected during different exposure time periods.

The light intensity of natural light changes very slowly in a short period of time. At least during the acquisition of a single frame of image, the light intensity of natural light can be considered to be constant. Therefore, under the assumption of uniform illumination in the space, when capturing video under natural light, for different lines of a single frame image and the same line of two adjacent frames, the incident light remains unchanged, the exposure must be equal when the exposure time remains unchanged, so there are few flickers in the captured video. However, when video is captured under a fluorescent lamp, due to the ballast mechanism used by the fluorescent lamp, the intensity of the output light is usually changed at twice the frequency of the alternating current supplied to the fluorescent lamp, that is, there are periodic changes in a short time. Therefore, when the exposure time is not an integer multiple of the period of the change in light output by the fluorescent lamp, the exposure of any line in a single frame image is changed, that is, the incident light has periodic light and dark changes in the vertical direction. This uneven illumination in the time domain causes periodic light and dark stripes in the vertical direction of the captured image. At the same time, if the initial exposure time interval (i.e. frame rate) of two adjacent frames is not an integer multiple of the period of the change in light output by the fluorescent lamp, the exposure of the same line of the adjacent two frames of images is also different. At this time, the light and dark stripes of the adjacent two frames of images are moving, thus forming rolling light and dark stripes in the video. Such rolling light and dark stripes seriously affect the visual effect of the video. If the initial exposure time interval of two adjacent frames is an integer multiple of the period of the change in light output from the fluorescent lamp, the exposure of the same line of the two adjacent frames is the same. At this time, the light and dark stripes of the adjacent two frames of image are still, there will be no rolling light and dark stripes in the video. Because the reflective object accounts for the main information in the image, and the light and dark change of the fluorescent lamp is a relatively weak change, the static light and dark stripes are usually difficult to detect in the video, so when the video frame rate matches the frequency of the fluorescent lamp, no matter whether the exposure time is an integer multiple of the period of the change in light output of the fluorescent lamp, no obvious flickering appear in the video. Generally, flicker occurs when the video frame rate does not match the frequency of the fluorescent lamp, and the exposure time is not an integer multiple of the period of the change in light output of the fluorescent lamp.

The existing method for detecting video flicker caused by a light source is mainly based on the periodicity of the flicker characteristics, and calculates the flicker characteristics by detecting the periodicity in the time domain, or the amplitude of the corresponding frequency of the periodicity in the frequency domain, or the correlation of the autocorrelation function, etc. However, the calculation of Fourier transform, autocorrelation function and other calculations are more complicated and require more storage space.

SUMMARY OF THE INVENTION

The present invention aims to provide a method for detecting video flicker, which solve the problems of the computational complexity of the existing method for detecting video flicker caused by a light source and requiring a high data storage space.

In a first aspect, the present invention provides a method for detecting video flicker, comprising steps of: S101, respectively calculating the line sums of the luminance components of two adjacent frames in a video frame sequence; S102, comparing the line sums of the luminance components of the two adjacent frames, and calculating a flicker component; S103, obtaining the light source flicker frequency according to an assumed k value; determining two different local intervals by the coordinates of a current point of the flicker component according to the light source flicker frequency; and respectively calculating a peak function and a valley function of the flicker component in the two different local intervals; where the light source flicker frequency is the light source flicker frequency when the two adjacent frames are taken, the light source flicker frequency is k times the frequency of the alternating current, and the assumed k value is one of the preset k value set; and
S104, determining whether there is video flicker caused by the light source in the current frame according to the peak function and the valley function of the flicker component in the two different local intervals:
if yes, determining the corresponding k value when there is video flicker caused by the light source is the assumed k value in step S103;
if not, selecting another different k value in the preset k value set as an assumed k value, and then returning to execute S103 and S104;
if performing all k values in the preset k value set as the assumed k value in step S103 and there is no video flicker caused by the light source, and then considering that there is no video flicker caused by the light source in the current frame.

In the second aspect, the present invention provides a method for reducing video flicker, including the following steps of:
determining whether there is video flicker in the current frame caused by the light source by performing the method for detecting video flicker for the continuous frames in the video frame sequence as described above; and determining whether a proportion of video flicker caused by the light source in the continuous frames greater than an alarm threshold: if yes, sending a flicker alarm signal, and adjusting exposure duration to eliminate flicker according to the k value determined in step S104 when there is video flicker caused by the light source.

In a third aspect, the present invention provides a non-transitory computer-readable storage medium that stores one or more computer programs including a set of computer-executable instructions, when the set of computer-executable instructions being executed by one or more processors, causes the one or more processors to perform steps of the method for detecting and/or reducing video flicker as described above.

In a fourth aspect, the present invention the present invention provides an image processing device, comprising:
one or more processors;
a memory; and
one or more computer programs;
the one or more processors and the memory are connected by a bus; the one or more computer programs including a set of computer-executable instructions are stored in the memory, and are configured to be executed by the one or more processors, and when executed by the one or more processors, cause the one or more processors to perform steps of the method for detecting and/or reducing video flicker as described above.

In accordance with the embodiments of the present invention, calculating the flicker component by comparing the line sums of the luminance components of two adjacent frames, the calculation complexity is low and the data storage space required is also less. In addition, the peak function and the valley function of the flicker component of the current frame in the two different local intervals are respectively calculated, so the peak value and the valley value can be quickly found. Also, since two different local intervals are determined according to the light source flicker frequency and the coordinates of the current point of the flicker component, the light source flicker frequency can be more accurately defined. Moreover, it is determined whether there is video flicker in the current frame caused by the light source according to the peak function and the valley function of the flicker component in two different local intervals. Therefore, the method of the present invention has good anti-interference ability and low false detection.

DETAILED DESCRIPTION OF THE INVENTION

The foregoing objects, technical solutions and advantages of the invention will be much clearer from the following detail description taken with the accompanying drawings and embodiments. It should be understood that the specific embodiments described herein are only used to explain the present invention and are not intended to limit the present invention.

In order to explain the technical solutions of the present invention, the following will be described by specific embodiments.

Figure 1:
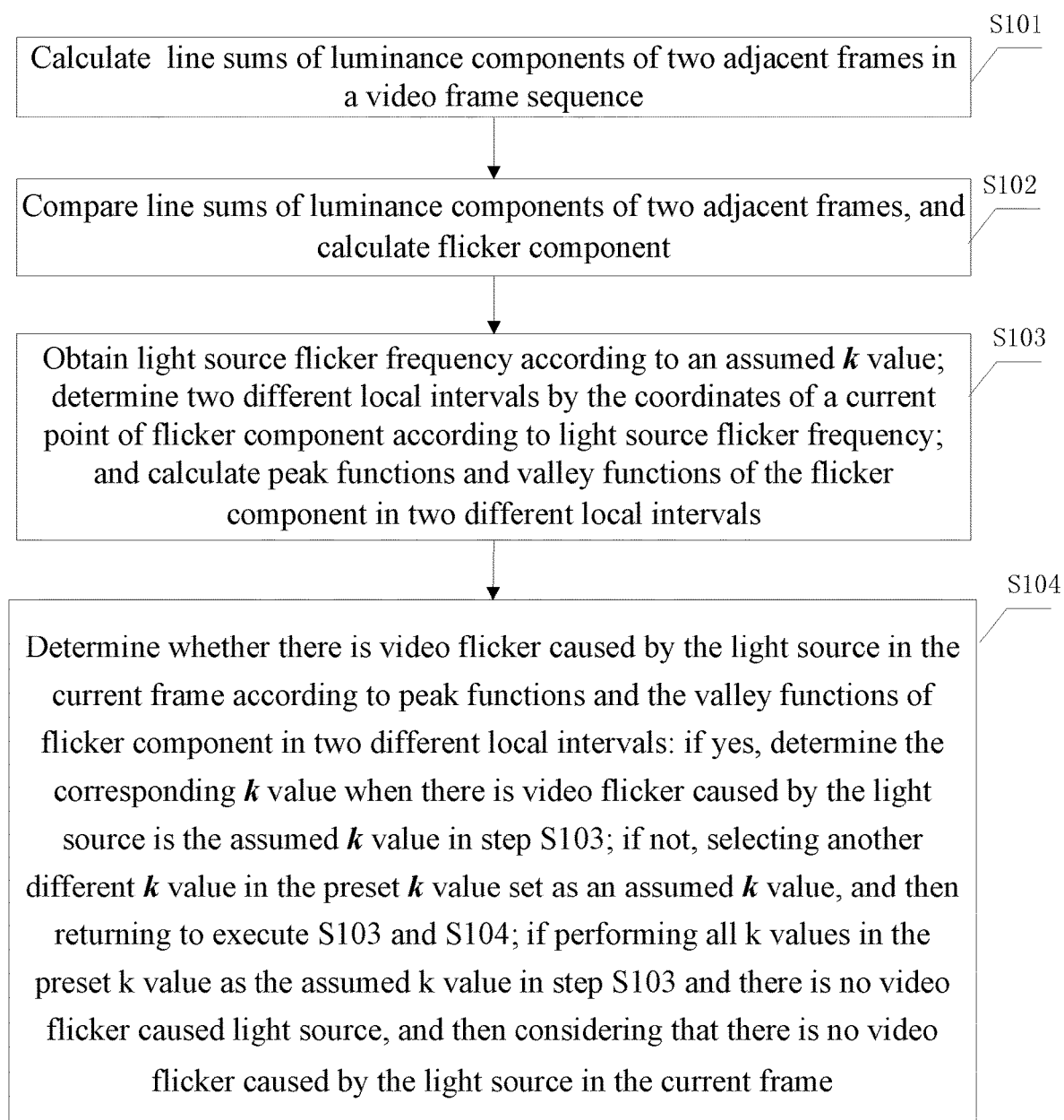
FIG. 1 is a flowchart of a method for detecting video flicker in accordance with a first embodiment of the present invention.

FIG. 1 illustrates a flowchart of a method for detecting video flicker in accordance with a first embodiment of the present invention provided. The first embodiment of the present invention mainly takes the method for detecting video flicker applied to an image processing device as an example for illustration. The method for detecting video flicker provided in the first embodiment of the present invention includes the following steps of S101 to S104. It should be noted that if there are substantially the same result, the method for detecting video flicker provided in the first embodiment of the present invention is not limited to the order of the process shown in FIG. 1.

S101, respectively calculating the line sums of the luminance components of two adjacent frames in a video frame sequence.

Different lines of the image are acquired by exposure at different time, video flicker is generated mainly due to the exposure of any line in the same frame of image being different, and the exposure of the same line in two adjacent frames is also different, so the video flicker can be detected based on the line sums of the luminance components of the image in an embodiment of the present invention.

In accordance with an embodiment of the present invention, S101 can comprise:
respectively calculating the line sum $s_{k-1}(i)$ of the luminance component of the previous frame and the line sum $s_k(i)$ of the luminance component of the current frame by formulas:

$$\begin{cases} s_{k-1}(i) = \sum_{j=1}^{N} Y_{k-1}(i, j) \\ s_k(i) = \sum_{j=1}^{N} Y_k(i, j) \end{cases}, i = 1, \ldots, M, j = 1, \ldots, N$$

where $Y_{k-1}(i, j)$ is the luminance component of the previous frame, $Y_k(i, j)$ is the luminance component of the current frame, the image size is M×N, i=1, ..., M, j=1, ..., N, and M and N are natural numbers greater than 1.

Regardless of whether it is a grayscale image or a color image, the luminance component can be extracted by any method known in the art, which is a method well known to those skilled in the art, and will not be repeated here.

S102, comparing the line sums of the luminance components of the two adjacent frames, and calculating a flicker component.

In accordance with an embodiment of the present invention, S102 can comprise:
calculating the flicker component FL(i) by formula:

$$FL(i) = \begin{cases} 0, i = 1 \\ FL(i-1) + 1, i > 1. \text{ and } s_k(i) > s_{k-1}(i) \\ FL(i-1) - 1, i > 1. \text{ and } s_k(i) < s_{k-1}(i) \\ FL(i-1), i > 1. \text{ and } s_k(i) = s_{k-1}(i) \end{cases}$$

where i=1, 2, ..., M.

Since the flicker component is calculated by comparing the line sums of the luminance components of two adjacent frames, the calculation complexity is low and the data storage space required is also less.

S103, obtaining the light source flicker frequency according to an assumed k value; determining two different local intervals by the coordinates of a current point of the flicker component according to the light source flicker frequency; and respectively calculating a peak function and a valley function of the flicker component in the two different local intervals; where the light source flicker frequency is the same when the two adjacent frames are taken, the light source flicker frequency is k times the frequency of the alternating current, and the assumed k value is one of the preset k value set.

As for the peak function, in the flicker component, when the current point is a peak (that is, the maximum value) in the local interval, the value of the peak function corresponding to the current point is 1, otherwise it is 0; as for the valley function, in the flicker component, when the current point is a valley (i.e. the minimum value) in the local interval, the valley function corresponding to the current point is 1, otherwise it is 0; where the two different local intervals have the current point as a center and have a length of $2d_1+1$ and a length of $2d_2+1$ respectively, both $d_1$ and $d_2$ represent positive integers, and the length of the local interval can be 3, 5, 7, 9 . . . etc.

The frequency of the alternating current is $f_{AC}$, the light source flicker frequency is k times the frequency of the alternating current, for example, k=2,3,4 . . . , then a period of change in light amount of the light source is $$\frac{1}{kf_{AC}};$$

the frame rate of the video is $T_{frame}$, $D_{frame}$ is the total lines (line sum) including vertical blanking intervals, and $$\frac{T_{frame}}{D_{frame}}$$

is the initial exposure time interval of two adjacent lines; therefore, a flicker period $D_{flicker}$ in the captured image is:

$$D_{flicker} = \left(\frac{1}{kf_{AC}}\right) \bigg/ \left(\frac{T_{frame}}{D_{frame}}\right) = \frac{D_{frame}}{kf_{AC}T_{frame}}.$$

Therefore, light sources with different frequency cause different flicker periods in the images. Generally, the frame rate of the video and the total lines including vertical blanking interval are fixed, and the flicker period in the image is determined by the light source flicker frequency. Ideally, when the scene is absolutely still, the difference $s_k(i)-s_{k-1}(i)$, i=1, . . . , M of the line sums of the luminance components of two adjacent frames is mainly caused by the different exposure of the same line of the two adjacent frames, because the scene of two adjacent frames is exactly the same, and the flicker streaks in the image are caused by the different exposure, so the difference of the line sums of the luminance components of two adjacent frames is the difference between the two adjacent flicker streaks, and the period is $D_{flicker}$. At this time, the flicker component FL(i), i=1, . . . , M is a triangular wave with a period of $D_{flicker}$. In the flicker component, a distance between the peak values of two different local intervals or between the valley values of two different local intervals is exactly the width of the flicker streaks. In actual situations, since the image in the video is rarely absolutely still, the positions of the peaks or valleys will be disturbed due to the brightness change of the image itself. However, when there is flicker in the image caused by the light source, in the flicker component, the peak values of the local intervals and the valley values of the local intervals have a certain rule: a distance between the peak values of two different local intervals or the valley values of two different local intervals is close to the width of the flicker streaks; the peak values of the local intervals and the valley values of the local intervals appear alternately; the number of peaks and valleys in the local intervals is related to the light source flicker frequency.

As mentioned above, the distance between the peak values of two different local intervals or the valley values of two different local intervals is close to the flicker period $D_{flicker}$, so the length of the local interval cannot exceed the flicker period $D_{flicker}$, otherwise some local peaks or valleys may be missed for detection. At the same time, if taking the length of two different local intervals as $$d_1 = \left\lfloor \frac{D_{flicker}}{4} \right\rfloor \text{ and } d_2 = \left\lfloor \frac{D_{flicker}}{8} \right\rfloor$$

respectively to calculate the peak function and valley function of the two different local intervals, when the flicker component has obvious flickers, the peak function and the valley function of the two different local intervals should have high similarity. The peak functions $P_{d1}(x)$ $P_{d2}(x)$ and valley functions $V_{d1}(x)$, $V_{d2}(x)$, $x \in [1, M]$ of the flicker component in two different local intervals can be quickly calculated by the local intervals with lengths of $2d_1+1$ and $2d_2+1$ respectively.

In an embodiment of the present invention, S103 may specifically comprise the steps of S1031 to S1036 as described below.

S1031, initializing the peak function, the valley functions and the coordinates of the current point. In an embodiment of the present invention, S1031 may specifically comprise: initializing the peak function $P_d(x)=0$, the valley function $V_d(x)=0$, $x \in [1, M]$, and the coordinate $I_{pre}=2$ of the current point.

S1032, obtaining the light source flicker frequency according to an assumed k value, determining two different local intervals by the coordinates of the current point of the flicker component according to the light source flicker frequency, and determining the coordinates of the maximum value and the coordinates of the minimum value of the flicker component in the two different local intervals.

In an embodiment of the present invention, S1032 specifically comprises steps of: determining local intervals [s e] by the position of the current point, where s represents a starting position, e represents an ending position, $$s = \begin{cases} 1, & I_{pre} - d < 1 \\ I_{pre} - d, & \text{others} \end{cases}, e = \begin{cases} M, & I_{pre} + d > M \\ I_{pre} + d, & \text{others} \end{cases}$$

where the value of d is $d=d_1$ or $d=d_2$, $$d_1 = \left\lfloor \frac{D_{flicker}}{4} \right\rfloor, d_2 = \left\lfloor \frac{D_{flicker}}{8} \right\rfloor;$$

$D_{flicker}$ represents a flicker period, $$D_{flicker} = \frac{D_{frame}}{kf_{AC}T_{frame}},$$

where $f_{AC}$ represents the frequency of the alternating current; the light source flicker frequency is k times the frequency of the alternating current, for example, the preset k value set includes k values 1,2,3,4 . . . n, the k value in the preset k value set is an empirical value which is usually 2; $T_{frame}$ represents a frame rate of the video, and $D_{frame}$ represents the line sum containing vertical blanking intervals, so that two different s values and two different e values are obtained, thereby determining two different local intervals; and finding the coordinate $I_{max}$ where the maximum value of the flicker component is located and the coordinate $I_{min}$ where the minimum value of the flicker component is located in the two different local intervals [s e] according to formulas:

$$FL(I_{max}) = \max(FL(i)), \; i \in [s \; e], \; FL(I_{min}) = \min(FL(i)), \; i \in [s \; e].$$

S1033, determining whether the current point is at the position where the maximum value or the minimum value of the flicker component is located in the local intervals according to the coordinates of the maximum value, the coordinates of the minimum value, and the coordinates of the current point: if yes, executing S1034; otherwise executing S1035.

In an embodiment of the present invention, S1033 specifically comprises:

if $I_{pre}=I_{max}$ or $I_{pre}=I_{min}$, executing S1034; otherwise executing S1035.

S1034, updating the peak function or the valley function corresponding to the current point, and then executing S1035.

In an embodiment of the present invention, the step of updating the peak function or the valley function corresponding to the current point, further comprises:

if $I_{pre}=I_{max}$, that is, the current point is at the position where the maximum value of the flicker component is located in the local interval, then updating the peak function: $P_d(I_{pre})=1$; and storing the coordinates of the current point in the peak coordinate set Ip; and if $I_{pre}=I_{min}$, that is, the current point is at the position where the minimum value of the flicker component is located in the local interval, updating the valley function: $V_d(I_{pre})=1$; and storing the coordinates of the current point in the valley coordinate set Iv.

S1035, jumping to the next point.

In an embodiment of the present invention, S1035 further comprises:

if $I_{pre}=I_{max}$ or $I_{pre}=I_{min}$, then jumping to the next point $I_{next}=e$;

if $I_{pre}\neq I_{max}$ and $I_{pre}\neq I_{min}$, that is, the current point is on the left of the positions where the maximum value and the minimum value of the flicker component are located in the local intervals, then jumping to the next point $I_{next}=\min(I_{min}, I_{max})$;

if $I_{pre}\neq I_{max}$, and $I_{pre}\neq I_{min}$, that is, the current point is on the right of the positions where the maximum value and the minimum value of the flicker component are located in the local intervals, then jumping to the next point $I_{next}=e$; and if the current point is in the middle between the positions where the maximum value and the minimum value of the flicker component are located in the local intervals, then jumping to the next point $I_{next}=\text{ma}(I_{min}, I_{max})$.

S1036, determining whether the next point is less than M: if yes, returning to S1032, and setting the coordinates $I_{pre}$ of the current point to the value of $I_{next}$; otherwise performing S104.

In an embodiment of the present invention, by respectively calculating the peak function and the valley function of the flicker components in two different local intervals of the current frame, the peak value and the valley value can be quickly found. In addition, the two different local intervals are determined by the coordinates of the current point of the flicker component according to the light source flicker frequency; therefore, the light source flicker frequency can be more accurately defined.

S104, determining whether there is video flicker caused by the light source in the current frame according to the peak function and the valley function of the flicker component in the two different local intervals:

if yes, determining the corresponding k value when there is video flicker caused by the light source is the assumed k value in step S103;

if not, selecting another different k value in the preset k value set as an assumed k value, and then returning to execute S103 and S104;

if performing all k values in the preset k value set as the assumed k value in step S103 and there is no video flicker caused by the light source, and then considering that there is no video flicker caused by the light source in the current frame.

There are mainly two alternating current frequencies used throughout the world: $f_{AC1}$=50 Hz and $f_{AC2}$=60 Hz. As described above, the light source flicker frequency is k times the frequency of the alternating current (for example, k=2, 3,4 . . . n); the difference in flicker frequency caused by 50 Hz and 60 Hz is small, while the difference in flicker frequency caused by the difference of k value is great. Therefore, when determining whether there is video flicker caused by the light source in the current frame, and assuming $f_{AC}$=50 Hz or $f_{AC}$=60 Hz, let k=2, k=3, k=4 . . . k=n:

first determining whether there is video flicker caused by the light source when k=2; if not, determining whether there is video flicker caused by the light source when k=3; if not, determining whether there is video flicker caused by the light source when k=4, and so on, until it is determined that there is no video flicker caused by the light source when k=n; then it is considered that there is no video flicker caused by the light source in the current frame.

In an embodiment of the present invention, S104 can specifically comprise steps of S1041 and S1042:

S1041, determining whether the peak coordinate set $I_{p1}$ of the peak function $P_{d1}(x)$ and the valley coordinate set $I_{v1}$ of the valley function $V_{d1}(x)$ of the flicker component in the first local interval of the two different local intervals meet the following conditions that:

(1) the element number in the peak coordinate set $I_{p1}$, that is, the number of peaks; and the element number in the valley coordinate set $I_{v1}$, that is, the number of valleys; all satisfy the formula:

$$\lceil k * f_{AC1} * T_{frame} \rceil \leq mum \leq \lceil k * f_{AC2} * T_{frame} \rceil + 1$$

where $T_{frame}$ is the frame rate of the video, num is the element number in the peak coordinate set $I_{p1}$ or the element number in the valley coordinate set $I_{v1}$, $f_{AC1}$ and $f_{AC2}$ are the frequencies of two alternating currents, for example, $f_{AC1}$ is 50 HZ, $f_{AC2}$ is 60 HZ, k is an assumed value in step S103;

(2) peaks and valleys appear alternately; and (3) the number of peaks on the left and right sides of the peak function is similar, and the number of valleys on the left and right sides of the valley function is similar; the smaller the threshold of the difference in the number of peaks and the threshold of the difference in the number of valleys, the higher the accuracy; but noise or movement may cause detection missed, the larger the thresholds, the lower the missed detection but the higher the false detection. Therefore, the threshold for the difference in the number of peaks and the threshold for the difference in the number of valleys are usually set to 1. The number of peaks on the left and right sides of the peak function is similar, and the number of valleys on the left and right sides of the valley function is similar; which can specifically be: the difference in the number of peaks on the left and right sides of the peak function is 0 or 1, and the difference in the number of valleys on the left and right sides of the valley function is 0 or 1.

Assuming that the length of the peak function or valley function is M, the number of peaks in the interval 1 to M/2 is the number of peaks on the left, and the number of peaks in the interval M/2 to M is the number of peaks on the right.

If the peak coordinate set of the peak function and the valley coordinate set of the valley function of the flicker component in the first local interval satisfy the above conditions at the same time, then executing S1042, otherwise determining that there is no video flicker in the current frame caused by the light source with $f_{AC1}$ or $f_{AC2}$ frequency of the alternating current; then selecting another different k value in the preset k value set as an assumed k value, and returning to execute S103 and S104;

performing all the k values in the preset k value set as the assumed k value in step S103, if there is still no video flicker caused by the light source, it is considered that there is no video flicker caused by the light source in the current frame.

S1042, calculating the peak value difference $D_p$ between the peak function $P_{d1}(x)$ of the flicker component in the first local interval and the peak function $P_{d2}(x)$ of the flicker component in the second local interval, and the valley value difference $D_v$ between the valley function $V_{d1}(x)$ of the flicker component in the first local interval and the valley function $V_{d2}(x)$ of the flicker component in the second local interval;

if the peak value difference $D_p$ being greater than or equal to a first threshold and the valley value difference $D_v$ being greater than or equal to a second threshold, then determining that there is video flicker in the current frame caused by the light source, and determining that the corresponding k value when there is video flicker caused by the light source is the assumed k value in step S103; otherwise determining that there is no video flicker in the current frame caused by the light source; and then selecting another different k value in the preset k value set as an assumed k value, and returning to execute S103 and S104;

if performing all k values in the preset k value set as an assumed k value, and there is still no video flicker caused by the light source, and then considering that there is no video flicker caused by the light source in the current frame.

S1042 specifically comprises:

calculating the peak value difference $D_p$ by the formula:

$$D_p = \sum_{x=1}^{M} |P_{d1}(x) - P_{d2}(x)|,$$

and calculating the valley value difference $D_v$ by the formula:

$$D_v = \sum_{x=1}^{M} |V_{d1}(x) - V_{d2}(x)|.$$

If $D_p \leq D_{p\ max}$, $D_v \leq D_{v\ max}$, $D_{pmax}$ is the first threshold and $D_{vmax}$ is the second threshold, then determining that there is video flicker in the current frame caused by the light source and determined the corresponding k value when there is video flicker in the current frame caused by the light source is the assumed k value in step S103; otherwise determining that there is no video flicker in the current frame caused by the light source, and then selecting another different k value in the preset k value set as an assumed k value, and returning to execute S103 and S104; if performing all k values in the preset k value set as an assumed k value, and there is still no video flicker caused by the light source, and then considering that there is no video flicker caused by the light source in the current frame.

By determining whether there is video flicker in the current frame caused by a light source according to the peak function and the valley function of the flicker component in two different local intervals; therefore, the method provided in the present invention has a good anti-interference ability and the false detection is low. Some existing method directly calculates the light source flicker frequency by the number of peaks, which is based on a relatively ideal scene, and the scene is relatively static. However, in actual situations, there will be some interference, the scene is also changing, the frequency of different light sources is different, the number of peaks and the distance between the peaks have a certain rule, when there is flicker in a certain frequency interval in the video, two specific local intervals calculated according to the light source flicker frequency, and two peak functions and two valley functions found in the two local intervals are respectively highly similar. If there is no similarity of the two peak functions or the two valley functions, then there is no flicker in the frame. What is judged here is whether there is flicker and the approximate interval of the light source flicker frequency. Therefore, the anti-interference ability is strong and the false detection is low.

Another embodiment of the present invention also provides a method for reducing video flicker, including the following steps of:

determining whether there is video flicker in the current frame caused by the light source by performing the method for detecting video flicker for the continuous frames in the video frame sequence as described above; and determining whether a proportion of video flicker caused by the light source in the continuous frames greater than an alarm threshold: if yes, sending a flicker alarm signal, and adjusting exposure duration to eliminate flicker according to the corresponding k value determined in step S104 when there is video flicker caused by the light source.

In another embodiment of the present invention, the step of determining whether a proportion of video flicker caused by the light source in the continuous frames greater than an alarm threshold, may specifically comprise:
determined whether the proportion of video flicker caused by the light source in the continuous frames is greater than 60% (or other values, such as 50%, 65%, 70%, etc., depending on actual needs).

When neither the exposure duration nor the frame interval duration is an integer multiple of a period of change in light of the fluorescent lamp, obvious flickering will occur. The frame rate of the video is usually fixed, and the exposure duration can be adjusted more flexibly. Therefore, the step of adjusting exposure duration to eliminate flicker, further comprises steps of: according to the corresponding k value determined in step S104 when there is video flicker caused by the light source, assuming that the current AC frequency is a first AC frequency $f_{AC1}$, for example, $f_{AC1}=50$ Hz, adjusting the exposure duration to an anti-flicker exposure duration $$\frac{K}{k*f_{AC1}}$$

closest to the current exposure duration, where K is an integer that makes the anti-flicker exposure duration closest to the current exposure duration; and
re-executing the method for detecting video flicker for the continuous frames in the video frame sequence to determine whether there is video flicker in the current frame caused by the light source; determining whether a proportion of video flicker caused by the light source in the continuous frames greater than an alarm threshold: if not, determining that the flickering phenomenon has been eliminated when the current AC frequency is the first AC frequency $f_{AC1}$; otherwise, assuming that the current AC frequency is a different AC frequency $f_{AC2}$, for example, $f_{AC2}=60$ Hz, adjusting the exposure duration to the anti-flicker exposure duration $$\frac{K}{k*f_{AC2}}$$

closest to the current exposure duration, where K is an integer that makes the anti-flicker exposure duration closest to the current exposure duration.

the present invention provides a non-transitory computer-readable storage medium that stores one or more computer programs including a set of computer-executable instructions, when the set of computer-executable instructions being executed by one or more processors, causes the one or more processors to perform steps of the method for detecting and/or reducing video flicker as described above.

Figure 2:
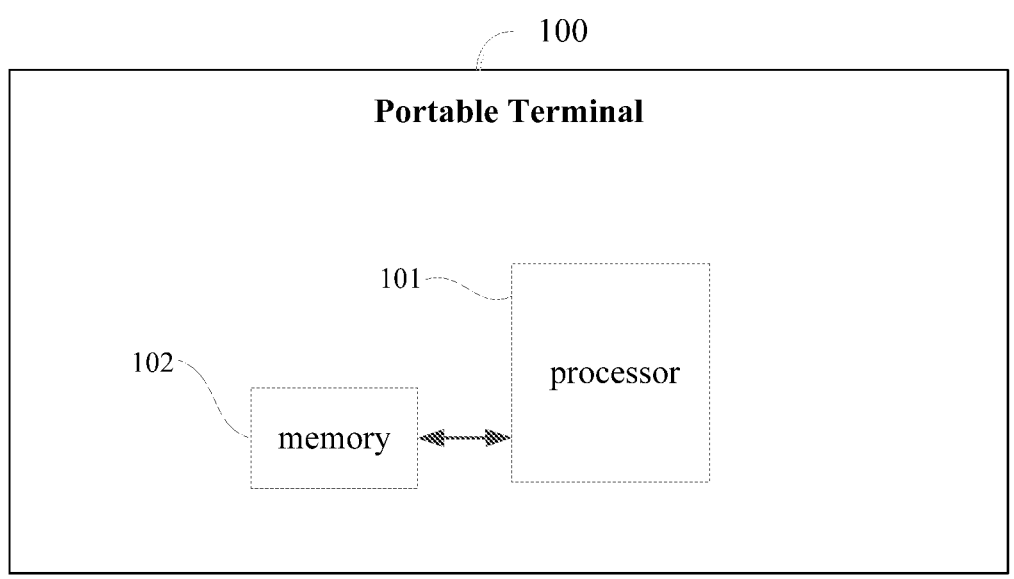
FIG. 2 is a schematic structural diagram of an image processing device in accordance with a third embodiment of the present invention.

FIG. 2 shows a specific structural block diagram of an image processing device provided in an embodiment of the present invention. The image processing device 100 comprises: one or more processors 101, a memory 102, and one or more computer programs. The processor 101 and the memory 102 are connected by a bus, and the one or more computer programs including a set of computer-executable instructions are stored in the memory 102 and configured to be executed by the one or more processors 101. When the one or more processors 101 execute the computer-executable instructions, perform the steps of the method for detecting video flicker provided in an embodiment of the present invention or preform the steps of the method for reducing video flicker provided by another embodiment of the present invention.

The image processing device may be a desktop computer, a mobile terminal, etc., and the mobile terminal includes a mobile phone, a tablet computer, a notebook computer, a personal digital assistant, and the like.

In accordance with the embodiments of the present invention, calculating the flicker component by comparing the line sums of the luminance components of two adjacent frames, the calculation complexity is low and the storage space required is also less. In addition, the peak function and the valley function of the flicker component of the current frame in the two different local intervals are respectively calculated, so the peak value and the valley value can be quickly found. Also, since the two different local intervals are determined according to the light source flicker frequency and the coordinates of the current point of the flicker component, the light source flicker frequency can be more accurately defined. Moreover, it is determined whether there is video flicker in the current frame caused by the light source according to the peak function and the valley function of the flicker component in the two different local intervals. Therefore, the method of the present invention has good anti-interference feature and low false detection.

It should be understood that the steps in the embodiments of the present invention are not necessarily executed in the order indicated by the step numbers. Unless specifically stated, there is no strict order for the execution of these steps, and these steps can be executed in other orders. Moreover, at least some steps in the embodiments may include sub-steps or multiple stages. These sub-steps or stages are not necessarily executed at the same time, and can be executed at different time. These sub-steps or stages is not necessarily carried out sequentially, and can be executed in turn or alternately with other steps or other sub-steps or stages.

A person of ordinary skill in the art can understand that all or part of the steps of the methods provided in the above-mentioned embodiments can be implemented by instructing relevant hardware through one or more computer programs, and the one or more programs can be stored in a non-transitory computer-readable storage medium. Wherein, any reference to memory, storage, database or other media used in the embodiments provided in this invention may include non-volatile and/or volatile memory. Non-volatile memory may include read only memory (ROM), programmable ROM (PROM), electrically programmable ROM (EPROM), electrically erasable programmable ROM (EEPROM), or flash memory. Volatile memory may include random access memory (RAM) or external cache memory. As an illustration and not a limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous chain Channel (Synchlink) DRAM (SLDRAM), memory bus (Rambus) direct RAM (RDRAM), direct memory bus dynamic RAM (DRDRAM), and memory bus dynamic RAM (RDRAM), etc.

The technical features of the above embodiments can be combined arbitrarily. In order to make the description concise, all possible combinations of the technical features in the above embodiments are not described. However, as long as there is no contradiction in the combination of these technical features, it should be considered as the scope of the specification.

The above only describes several embodiments of the present invention, and the description is more specific and detailed, but it cannot be understood as a limitation on the scope of the invention. It should be pointed out that for those of ordinary skill in the art, without departing from the concept of the present invention, several modifications and improvements can be made, and these all fall within the protection scope of the present invention. Therefore, the protection scope of the present invention should be subject to the appended claims.

What is claimed is:

1. A method for detecting video flicker, comprising steps of:

S101, respectively calculating line sums of luminance components of two adjacent frames in a video frame sequence;

S102, comparing the line sums of the luminance components of the two adjacent frames, and calculating a flicker component;

S103, obtaining a light source flicker frequency according to an assumed k value;

determining two different local intervals by the coordinates of a current point of the flicker component according to the light source flicker frequency; and respectively calculating a peak function and a valley function of the flicker component in the two different local intervals; where the light source flicker frequency is the light source flicker frequency when the two adjacent frames are taken, the light source flicker frequency is k times the frequency of an alternating current, and the assumed k value is one of a preset k value set; and S104, determining whether there is video flicker caused by the light source in a current frame according to the peak function and the valley function of the flicker component in the two different local intervals:

if yes, determining the corresponding k value when there is video flicker caused by the light source is the assumed k value in step S103;

if not, selecting another different k value in the preset k value set as an assumed k value, and then returning to execute S103 and S104;

if performing all the k values in the preset k value set as the assumed k value in step S103 and there is no video flicker caused by the light source, and then considering that there is no video flicker caused by the light source in the current frame.

2. The method of claim 1, wherein S101 comprises:

respectively calculating the line sum $s_{k-1}(i)$ of the luminance component of a previous frame and the line sum $s_k(i)$ of the luminance component of the current frame by formulas:

$$\begin{cases} s_{k-1}(i) = \sum_{j=1}^{N} Y_{k-1}(i,j) \\ s_k(i) = \sum_{j=1}^{N} Y_k(i,j) \end{cases}, i = 1, \ldots, M, j = 1, \ldots, N$$

where $Y_{k-1}(i,j)$ is the luminance component of the previous frame, $Y_k(i,j)$ is the luminance component of the current frame, an image size is M×N, i=1, ... j=1, ..., N, and M and N are natural numbers greater than 1.

3. The method of claim 2, wherein S102 comprises:

calculating the flicker component FL(i) by formula:

$$FL(i) = \begin{cases} 0, i = 1 \\ FL(i-1) + 1, i > 1. \text{ and } s_k(i) > s_{k-1}(i) \\ FL(i-1) - 1, i > 1. \text{ and } s_k(i) < s_{k-1}(i) \\ FL(i-1), i > 1. \text{ and } s_k(i) = s_{k-1}(i) \end{cases}$$

where i=1,2, ... ,M.

4. The method of claim 3, wherein S103 comprises steps of:

S1031, initializing the peak function, the valley functions and the coordinates of a current point;

S1032, obtaining the light source flicker frequency according to an assumed k value, determining two different local intervals by the coordinates of the current point of the flicker component according to the light source flicker frequency, and determining the coordinates of the maximum value and the coordinates of the minimum value of the flicker component in the two different local intervals;

S1033, determining whether the current point is at a position where the maximum value or the minimum value of the flicker component is located in the local intervals according to the coordinates of the maximum value, the coordinates of the minimum value, and the coordinates of the current point: if yes, executing S1034; otherwise executing S1035;

S1034, updating the peak function or the valley function corresponding to the current point, and then executing S1035;

S1035, jumping to a next point; and

S1036, determining whether the next point is less than M: if yes, returning to S1032, and setting the coordinates $I_{pre}$ of the current point to the value of $I_{next}$; otherwise performing S104.

5. The method of claim 4, wherein S1031 comprises:

initializing the peak function Pd(x)=0, the valley function Vd(x)=0, x∈[1,M], and the coordinate $I_{pre}2$ of the current point;

S1032 specifically comprises steps of:
determining local intervals [s e] by the position of the current point, where s represents a starting position, e represents an ending position;

$$s = \begin{cases} 1, I_{pre} - d < 1 \\ I_{pre} - d, \text{others} \end{cases}, e = \begin{cases} M, I_{pre} + d > M \\ I_{pre} + d, \text{others} \end{cases}$$

where the value of d is $d=d_1$ or $d=d_2$, $$d_1 = \left\lfloor \frac{D_{flicker}}{4} \right\rfloor, d_2 = \left\lfloor \frac{D_{flicker}}{8} \right\rfloor;$$

$D_{flicker}$ represents a flicker period, $$D_{flicker} = \frac{D_{frame}}{kf_{AC}T_{frame}},$$

wherefic $f_{AC}$ represents the frequency of the alternating current;
the light source flicker frequency is k times the frequency of the alternating current; $T_{frame}$ represents a frame rate of the video, and $D_{frame}$ represents a line sum containing vertical blanking intervals, so that two different s values and two different e values are obtained, whereby determining two different local intervals; and
finding the coordinate $I_{max}$ where the maximum value of the flicker component is located and the coordinate $I_{min}$ where the minimum value of the flicker component is located in the two different local intervals [s e] according to formulas:

$$FL(I_{max}) = \max(FL(i)), i \in [s\ e], FL(I_{min}) = \min(FL(i)), i \in [s\ e].$$

6. The method of claim 5, wherein S1033 comprises:
if $I_{pre} = I_{max}$ or $I_{pre} = I_{min}$, executing S1034; otherwise executing S1035;
S1034 comprises:
if $I_{pre} = I_{max}$, that is, the current point is at the position where the maximum value of the flicker component is located in the local interval, then updating the peak function: $P_d(I_{pre})=1$; and
storing the coordinates of the current point in a peak coordinate set Ip; and
if $I_{pre} = I_{min}$, that is, the current point is at the position where the minimum value of the flicker component is located in the local interval, updating the valley function: $V_d(I_{pre})=1$; and storing the coordinates of the current point in a valley coordinate set Iv.
7. The method of claim 6, wherein S1035 comprises:
if $I_{pre} = I_{max}$ or $I_{pre} = I_{min}$, then jumping then to the next point $I_{next}=e$;
if $I_{pre}<I_{max}$ or $I_{pre}<I_{min}$, that is, the current point is on a left side of the positions where the maximum value and the minimum value of the flicker component are located in the local intervals, then jumping to the next point $I_{next}=\min(I_{min},I_{max})$;
if $I_{pre}>I_{max}$ or $I_{pre}>I_{min}$, that is, the current point is on a right side of the positions where the maximum value and the minimum value of the flicker component are located in the local intervals, then jumping to the next point $I_{next}=e$; and
if the current point is in the middle between the positions where the maximum value and the minimum value of the flicker component are located in the local intervals, then jumping to the next point $I_{next}=\max(I_{min},I_{max})$.

8. The method of claim 6, wherein S104 further comprises steps of S1041 and S1042:
S1041, determining whether the peak coordinate set $I_{p1}$ of the peak function $P_{d1}(x)$ and the valley coordinate set $I_{v1}$ of the valley function $V_{d1}(x)$ of the flicker component in the first local interval of the two different local intervals meet the following conditions that:
(1) an element number in the peak coordinate set $I_{p1}$, that is, the number of peaks; and
an element number in the valley coordinate set $I_{v1}$, that is, the number of valleys; all satisfy the formula:

$$\lceil k*f_{AC1}*T_{frame} \rceil \leq mum \leq \lceil k*f_{AC2}*T_{frame} \rceil + 1$$

where $T_{frame}$ is the frame rate of the video, num is the element number in the peak coordinate set $I_{p1}$ or the element number in the valley coordinate set $I_{v1}$, $f_{AC1}$ and $f_{AC2}$ are the frequencies of two alternating currents, k is an assumed value in step S103;
(2) peaks and valleys appear alternately; and
(3) the number of peaks on the left and right sides of the peak function is similar, and the number of valleys on the left and right sides of the valley function is similar;
if the peak coordinate set of the peak function and the valley coordinate set of the valley function of the flicker component in the first local interval satisfy the above conditions at the same time, then executing S1042, otherwise determining that there is no video flicker in the current frame caused by the light source with $f_{AC1}$ or $f_{AC2}$ frequency of the alternating current;
selecting another different k value in the preset k value set as an assumed k value, and returning to execute S103 and S104; and
performing all the k values in the preset k value set as the assumed k value in step S103, if there is still no video flicker caused by the light source, and then considering that there is no video flicker caused by the light source in the current frame;
S1042, calculating a peak value difference $D_p$ between the peak function $P_{d1}(x)$ of the flicker component in the first local interval and the peak function $P_{d2}(x)$ of the flicker component in the second local interval, and a valley value difference $D_v$ between the valley function $V_{d1}(x)$ of the flicker component in the first local interval and the valley function $V_{d2}(x)$ of the flicker component in the second local interval;
if the peak value difference $D_p$ being greater than or equal to a first threshold and the valley value difference $D_v$ being greater than or equal to a second threshold, then determining that there is video flicker in the current frame caused by the light source, and determining that the corresponding k value when there is video flicker caused by the light source is the assumed k value in step S103; otherwise determining that there is no video flicker in the current frame caused by the light source; and then selecting another different k value in the preset k value set as an assumed k value, and returning to execute S103 and S104;

if performing all the k values in the preset k value set as an assumed k value in step S103, and there is still no video flicker caused by the light source, and then considering that there is no video flicker caused by the light source in the current frame.

9. The method of claim 8, wherein S1042 comprises:
calculating the peak value difference $D_p$ by the formula:

$$D_p = \sum_{x=1}^{M} |P_{d1}(x) - P_{d2}(x)|;$$

and
calculating the valley value difference Dv by the formula:

$$D_v = \sum_{x=1}^{M} |V_{d1}(x) - V_{d2}(x)|;$$

if $D_p \leq D_{p\,max}$, $D_v \leq D_{v\,max}$, $D_{pmax}$ is the first threshold and $D_{vmax}$ is the second threshold, then determining that there is video flicker in the current frame caused by the light source and determined the corresponding k value when there is video flicker in the current frame caused by the light source is the assumed k value in step S103; otherwise determining that there is no video flicker in the current frame caused by the light source, and then selecting another different k value in the preset k value set as an assumed k value, and returning to execute S103 and S104; if performing all the k values in the preset k value set as an assumed k value, and there is still no video flicker caused by the light source, and then considering that there is no video flicker caused by the light source in the current frame.

10. A method for reducing video flicker, comprising steps of:
determining whether there is video flicker in a current frame caused by a light source by performing the method of claim 1 for detecting video flicker for continuous frames in a video frame sequence; and
determining whether a proportion of video flicker caused by the light source in the continuous frames greater than an alarm threshold: if yes, sending a flicker alarm signal, and adjusting exposure duration to eliminate flicker according to the corresponding k value determined in step S104 when there is video flicker caused by the light source.

11. The method of claim 10, wherein the step of adjusting exposure duration to eliminate flicker, further comprises steps of:
according to the corresponding k value determined in step S104 when there is video flicker caused by the light source, assuming that a current AC frequency is a first AC frequency $f_{AC1}$, adjusting the exposure duration to an anti-flicker exposure duration $$\frac{K}{k * f_{AC1}}$$

closest to a current exposure duration, where K is an integer that makes the anti-flicker exposure duration closest to the current exposure duration; and re-executing the method of claim 1 for detecting video flicker for the continuous frames in the video frame sequence to determine whether there is video flicker in the current frame caused by the light source; determining whether a proportion of video flicker caused by the light source in the continuous frames greater than an alarm threshold: if not, determining that the flickering phenomenon has been eliminated when the current AC frequency is the first AC frequency $f_{AC1}$;
otherwise, assuming that the current AC frequency is a different AC frequency $f_{AC2}$, adjusting the exposure duration to the anti-flicker exposure duration $$\frac{K}{k * f_{AC2}}$$

closest to the current exposure duration, where K is an integer that makes the anti-flicker exposure duration closest to the current exposure duration.

12. A non-transitory computer-readable storage medium that stores one or more computer programs including a set of computer-executable instructions, when one or more processors execute the set of computer-executable instructions, can perform a method for detecting video flicker comprising steps of:
S101, respectively calculating line sums of luminance components of two adjacent frames in a video frame sequence;
S102, comparing the line sums of the luminance components of the two adjacent frames, and calculating a flicker component;
S103, obtaining a light source flicker frequency according to an assumed k value;
determining two different local intervals by the coordinates of a current point of the flicker component according to the light source flicker frequency; and respectively calculating a peak function and a valley function of the flicker component in the two different local intervals; where the light source flicker frequency is the light source flicker frequency when the two adjacent frames are taken, the light source flicker frequency is k times the frequency of an alternating current, and the assumed k value is one of a preset k value set; and
S104, determining whether there is video flicker caused by the light source in a current frame according to the peak function and the valley function of the flicker component in the two different local intervals:
if yes, determining the corresponding k value when there is video flicker caused by the light source is the assumed k value in step S103;
if not, selecting another different k value in the preset k value set as an assumed k value, and then returning to execute S103 and S104;
if performing all the k values in the preset k value set as the assumed k value in step S103 and there is no video flicker caused by the light source, and then considering that there is no video flicker caused by the light source in the current frame.

13. The non-transitory computer-readable storage medium of claim 12, wherein after the one or more processors perform the steps of the method for detecting video flicker for continuous frames in the video frame sequence, and can further perform a method for reducing video flicker comprising steps of:

determining whether there is video flicker in the current frame caused by the light source by performing the steps of the method for detecting video flicker for the continuous frames in the video frame sequence; and determining whether a proportion of video flicker caused by the light source in the continuous frames greater than an alarm threshold: if yes, sending a flicker alarm signal, and adjusting exposure duration to eliminate flicker according to the corresponding k value determined in step S104 when there is video flicker caused by the light source.

14. The non-transitory computer-readable storage medium of claim 13, wherein the step of adjusting exposure duration to eliminate flicker, further comprises steps of:

according to the corresponding k value determined in step S104 when there is video flicker caused by the light source, assuming that a current AC frequency is a first AC frequency $f_{AC1}$, adjusting the exposure duration to an anti-flicker exposure duration $$\frac{K}{k * f_{AC1}}$$

closest to a current exposure duration, where K is an integer that makes the anti-flicker exposure duration closest to the current exposure duration; and re-executing said steps of the method for detecting video flicker for the continuous frames in the video frame sequence to determine whether there is video flicker in the current frame caused by the light source; determining whether a proportion of video flicker caused by the light source in the continuous frames greater than an alarm threshold: if not, determining that the flickering phenomenon has been eliminated when the current AC frequency is the first AC frequency $f_{AC1}$;

otherwise, assuming that the current AC frequency is a different AC frequency $f_{AC2}$, adjusting the exposure duration to the anti-flicker exposure duration $$\frac{K}{k * f_{AC2}}$$

closest to the current exposure duration, where K is an integer that makes the anti-flicker exposure duration closest to the current exposure duration.

15. An image processing device, comprising:
one or more processors;
a memory; and
one or more computer programs;
the one or more processors and the memory are connected by a bus; the one or more computer programs including a set of computer-executable instructions are stored in the memory, and are configured to be executed by the one or more processors, when the one or more processors execute the set of computer-executable instructions, can perform a method for detecting video flicker comprising steps of:

S101, respectively calculating line sums of luminance components of two adjacent frames in a video frame sequence;

S102, comparing the line sums of the luminance components of the two adjacent frames, and calculating a flicker component;

S103, obtaining a light source flicker frequency according to an assumed k value;

determining two different local intervals by the coordinates of a current point of the flicker component according to the light source flicker frequency; and respectively calculating a peak function and a valley function of the flicker component in the two different local intervals; where the light source flicker frequency is the light source flicker frequency when the two adjacent frames are taken, the light source flicker frequency is k times the frequency of an alternating current, and the assumed k value is one of a preset k value set; and S104, determining whether there is video flicker caused by the light source in a current frame according to the peak function and the valley function of the flicker component in the two different local intervals:

if yes, determining the corresponding k value when there is video flicker caused by the light source is the assumed k value in step S103;

if not, selecting another different k value in the preset k value set as an assumed k value, and then returning to execute S103 and S104;

if performing all the k values in the preset k value set as the assumed k value in step S103 and there is no video flicker caused by the light source, and then considering that there is no video flicker caused by the light source in the current frame.

16. The device of claim 15, wherein after the one or more processors perform the steps of the method for detecting video flicker for continuous frames in the video frame sequence, can further perform a method for reducing video flicker comprising steps of:

determining whether there is video flicker in the current frame caused by the light source by performing the steps of the method for detecting video flicker for the continuous frames in the video frame sequence; and determining whether a proportion of video flicker caused by the light source in the continuous frames greater than an alarm threshold: if yes, sending a flicker alarm signal, and adjusting exposure duration to eliminate flicker according to the corresponding k value determined in step S104 when there is video flicker caused by the light source.

17. The device of claim 16, wherein the step of adjusting exposure duration to eliminate flicker, further comprises steps of:

according to the corresponding k value determined in step S104 when there is video flicker caused by the light source, assuming that a current AC frequency is a first AC frequency $f_{AC1}$, adjusting the exposure duration to an anti-flicker exposure duration $$\frac{K}{k * f_{AC1}}$$

closest to a current exposure duration, where K is an integer that makes the anti-flicker exposure duration closest to the current exposure duration; and re-executing said steps of the method for detecting video flicker for the continuous frames in the video frame sequence to determine whether there is video flicker in the current frame caused by the light source; determining whether a proportion of video flicker caused by the light source in the continuous frames greater than an alarm threshold: if not, determining that the flickering phenomenon has been eliminated when the current AC frequency is the first AC frequency $f_{AC1}$;

otherwise, assuming that the current AC frequency is a different AC frequency $f_{AC2}$, adjusting the exposure duration to the anti-flicker exposure duration $$\frac{K}{k * f_{AC2}}$$

closest to the current exposure duration, where K is an integer that makes the anti-flicker exposure duration closest to the current exposure duration.

\* \* \* \* \*